United States Patent
Nicholls

(10) Patent No.: US 7,136,449 B2
(45) Date of Patent: *Nov. 14, 2006

(54) NUCLEAR REACTOR PLANT

(75) Inventor: David Richard Nicholls, Halfway House (ZA)

(73) Assignee: Eskom, Sandton (ZA)

( * ) Notice: Subject to any disclaimer, the term of this patent is extended or adjusted under 35 U.S.C. 154(b) by 173 days.

This patent is subject to a terminal disclaimer.

(21) Appl. No.: 10/332,384

(22) PCT Filed: Aug. 8, 2001

(86) PCT No.: PCT/IB01/01416

§ 371 (c)(1),
(2), (4) Date: Aug. 21, 2003

(87) PCT Pub. No.: WO02/15197

PCT Pub. Date: Feb. 21, 2002

(65) Prior Publication Data

US 2004/0028171 A1 Feb. 12, 2004

(30) Foreign Application Priority Data

Aug. 16, 2000 (ZA) .................................. 2000/4187

(51) Int. Cl.
*G21C 15/00* (2006.01)
(52) U.S. Cl. ........................ 376/361; 376/283; 376/298
(58) Field of Classification Search ................ 376/361, 376/354, 283, 272, 298; 137/125
See application file for complete search history.

(56) References Cited

U.S. PATENT DOCUMENTS

| 3,230,373 | A | | 1/1966 | Montgomery |
| 3,621,926 | A | * | 11/1971 | Townsend .................... 376/372 |
| 3,951,164 | A | * | 4/1976 | Crist ........................... 137/218 |
| 5,000,907 | A | * | 3/1991 | Chevereau et al. ......... 376/282 |
| 5,096,659 | A | * | 3/1992 | Hidaka et al. .............. 376/283 |
| 5,202,084 | A | * | 4/1993 | Fennern et al. ............. 376/433 |
| 5,268,942 | A | * | 12/1993 | Newton et al. ............. 376/272 |
| 5,377,242 | A | * | 12/1994 | Carlton et al. .............. 376/282 |
| 6,269,833 | B1 | * | 8/2001 | Hein et al. ................... 137/216 |

FOREIGN PATENT DOCUMENTS

| FR | 2 762 436 | 4/1998 |
| GB | 2 157 880 A1 | 10/1985 |

OTHER PUBLICATIONS

International Search Report, International Application No. PCT/IB01/01416, dated Feb. 28, 2002 by EPO.

* cited by examiner

*Primary Examiner*—Ricardo J. Palabrica
(74) *Attorney, Agent, or Firm*—Marshall, Gerstein & Borun LLP

(57) ABSTRACT

The invention provides a cooling system which includes at least one and preferably a plurality of coolant chambers arranged around a heat source, typically a nuclear reactor. A coolant inlet pipe enters the or each coolant chamber at a high level and extends downwardly through the coolant chamber to a discharge end positioned at a low level within the coolant chamber. At least one anti-siphon bleed opening is provided in that portion of the coolant pipe which is positioned at the highest level within the coolant chamber.

6 Claims, 2 Drawing Sheets

NUCLEAR REACTOR PLANT

Figure 1:
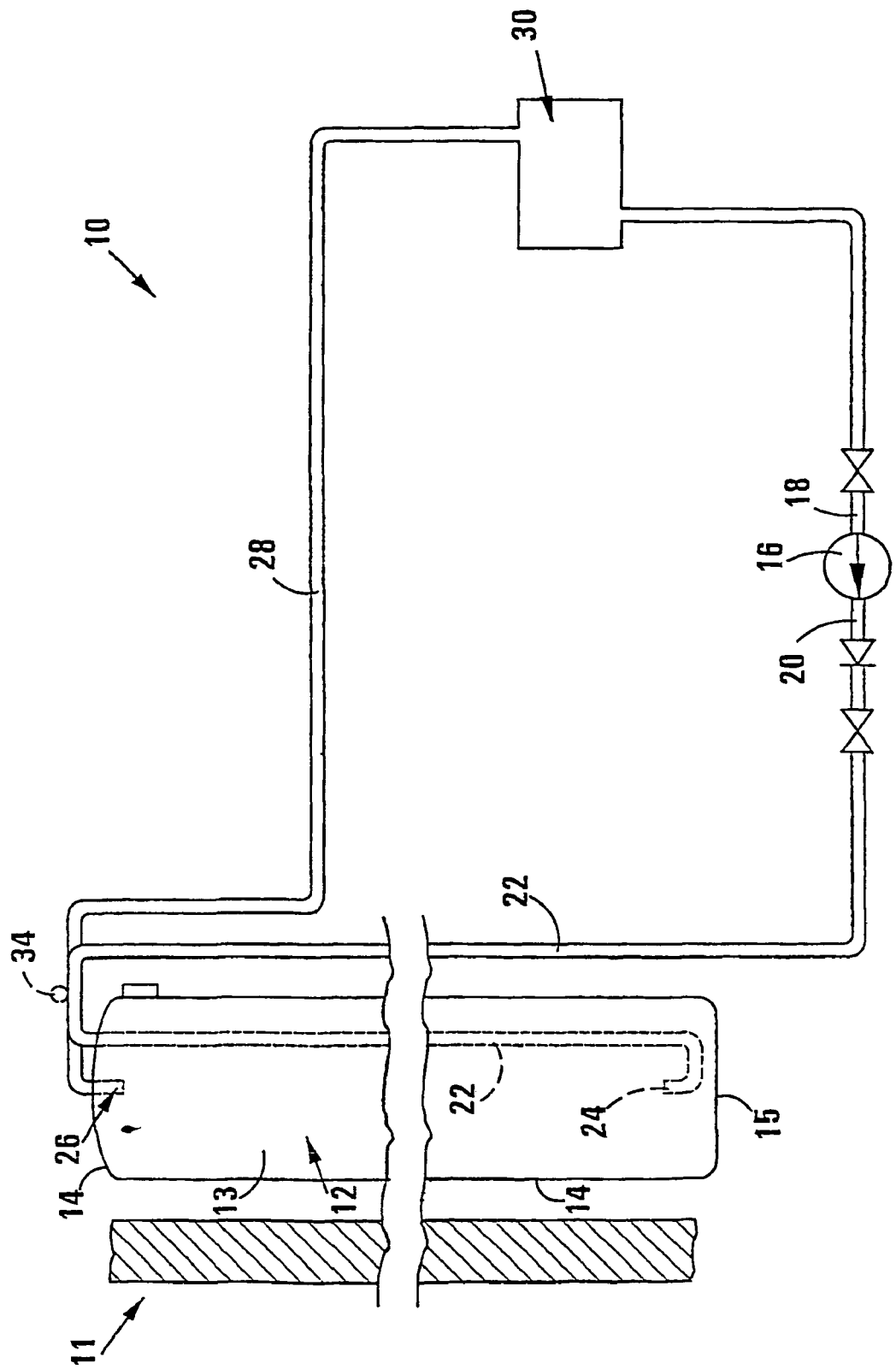

THIS INVENTION relates to a nuclear reactor plant. It further relates to a method of operating and to a method of constructing a nuclear reactor plant. It also relates to a cooling system.

In a nuclear reactor plant, use is often made of a liquid coolant such as inhibited demineralized water, to cool the reactor and the cavity in which it is installed. Typically, use is made of a closed loop cooling system which includes one or more coolant chambers, arranged around at least part of the reactor, and pump means for pumping the coolant into and through the coolant chambers. A coolant inlet typically leads into the coolant chambers at a low level and a coolant outlet leads from the coolant chambers at a high level.

A problem with this arrangement is that, should a breach occur in the inlet pipe, the coolant will drain from the coolant chambers which could lead to a potentially dangerous situation arising.

It is an object of this invention to provide means which the Inventors believe will at least alleviate this problem.

According to the invention there is provided a nuclear reactor plant which includes
a heat source;
at least one coolant chamber positioned in proximity to the heat source;
a coolant inlet pipe which enters the coolant chamber at a high level and extends downwardly through the coolant chamber to a discharge end positioned at a low level within the coolant chamber; and
an outlet leading from the coolant chamber at a high level.

The nuclear reactor plant may include a plurality of coolant chambers arranged around the heat source, each of at least some of the coolant chambers having an inlet pipe which enters the coolant chamber at a high level and extends downwardly through the coolant chamber to a discharge end positioned at a low level within the coolant chamber.

In one embodiment of the invention the heat source is a nuclear reactor. Preferably, the reactor may be a high temperature gas-cooled reactor of the type known as a Pebble Bed Reactor in which fuel, comprising a plurality of generally spherical fuel elements, is used. The fuel elements may comprise spheres of fissionable material in a ceramic matrix, or encapsulated in the ceramic material. In this embodiment of the invention gas coolant, eg helium, is fed through the reactor and liquid coolant is fed through the or each coolant chamber.

In another embodiment of the invention the heat source is a used fuel storage facility.

The plant may include anti-siphon means to reduce the risk that coolant will be siphoned from the coolant chamber, eg as a result of a breach occurring in the inlet pipe outside the coolant chamber.

The anti-siphon means may include an anti-siphon valve mounted in the inlet pipe, typically at the highest point thereof.

Instead, or in addition, the anti-siphon means may include at least one anti-siphon bleed opening provided in that portion of the coolant inlet pipe positioned within the coolant chamber at a position spaced from the discharge end whereby the coolant inlet pipe and the coolant chamber are connected or connectable in flow communication.

Preferably, a plurality of anti-siphon bleed openings is provided in that portion of the coolant inlet pipe which is positioned at the highest level within the coolant chamber.

The anti-siphon bleed openings may be in the form of holes in the pipe dimensioned to be sufficiently small so that, in normal use, the small amount of coolant flowing therethrough into the coolant chamber will have no or little detrimental effect on the cooling system and sufficiently large such that in the event of coolant being siphoned from the coolant chamber, when the coolant level in the coolant chamber falls below the level of the holes, sufficient gas, typically air, will be drawn from the coolant chamber into the coolant inlet pipe to break the vacuum and stop the siphoning.

The anti-siphon bleed opening may be in the form of holes in the coolant inlet pipe which will have a combined area of between 1% and 10% of the cross-sectional area of the coolant inlet pipe.

In an inlet pipe having a nominal diameter of 100 mm, typically between 4 and 8 anti-siphon bleed openings will be provided. The bleed openings will typically be circular and have a diameter of between 5 and 10 mm.

The plant typically includes a pump, an outlet of which is connected to the or each coolant inlet pipe. The pump and the or each coolant chamber typically form part of a closed loop cooling system.

The invention extends to a method of operating a nuclear plant having a heat source and at least one coolant chamber positioned in proximity to the heat source which method includes the steps of
feeding coolant into the coolant chamber through a coolant inlet pipe which enters the coolant chamber at a high level and extends downwardly through the coolant chamber to discharge coolant into the coolant chamber at a low level; and
removing coolant from the coolant chamber at a high level.

The method may include inhibiting the draining of coolant from the coolant chamber by being siphoned from the coolant chamber through the coolant inlet pipe.

The method may include the step of, in the event of coolant being siphoned from the coolant chamber through the coolant inlet pipe, bleeding gas into the coolant inlet pipe to stop the siphoning.

The method may include bleeding gas from the coolant chamber through at least one bleed opening in the coolant inlet pipe into the coolant inlet pipe when the level of liquid coolant in the coolant chamber falls below the level of the at least one bleed opening.

The invention further extends to a method of constructing a nuclear reactor plant having a reactor cavity and at least one coolant chamber positioned in proximity to the reactor cavity which method includes providing, a coolant inlet pipe which leads into the at least one coolant chamber at a high level and extends downwardly through the coolant chamber to a discharge position at a low level of the coolant chamber.

The method may include the step of providing a plurality of coolant chambers around the reactor cavity.

The method may include providing anti-siphon means in the inlet pipe.

It will be appreciated that whilst the primary application of the invention is in respect of a nuclear reactor plant, the cooling system described may well have other applications.

Hence, the invention extends to a cooling system which includes
at least one coolant chamber;
a coolant inlet pipe which enters the coolant chamber at a high level and extends downwardly through the coolant chamber to a discharge end positioned at a low level within the coolant chamber; and
an outlet leading from the coolant chamber at a high level.

The cooling system may include a plurality of coolant chambers arranged around a heat source, each of at least some of the coolant chambers having an inlet pipe which enters the coolant chamber at a high level and extends downwardly through the coolant chamber to a discharge end positioned at a low level within the coolant chamber.

An advantage with this arrangement is that, should a breach in the inlet pipe occur, the coolant will not simply drain from the coolant chamber.

The invention will now be described, by way of example, with reference to the accompanying diagrammatic drawings.

Figure 2:
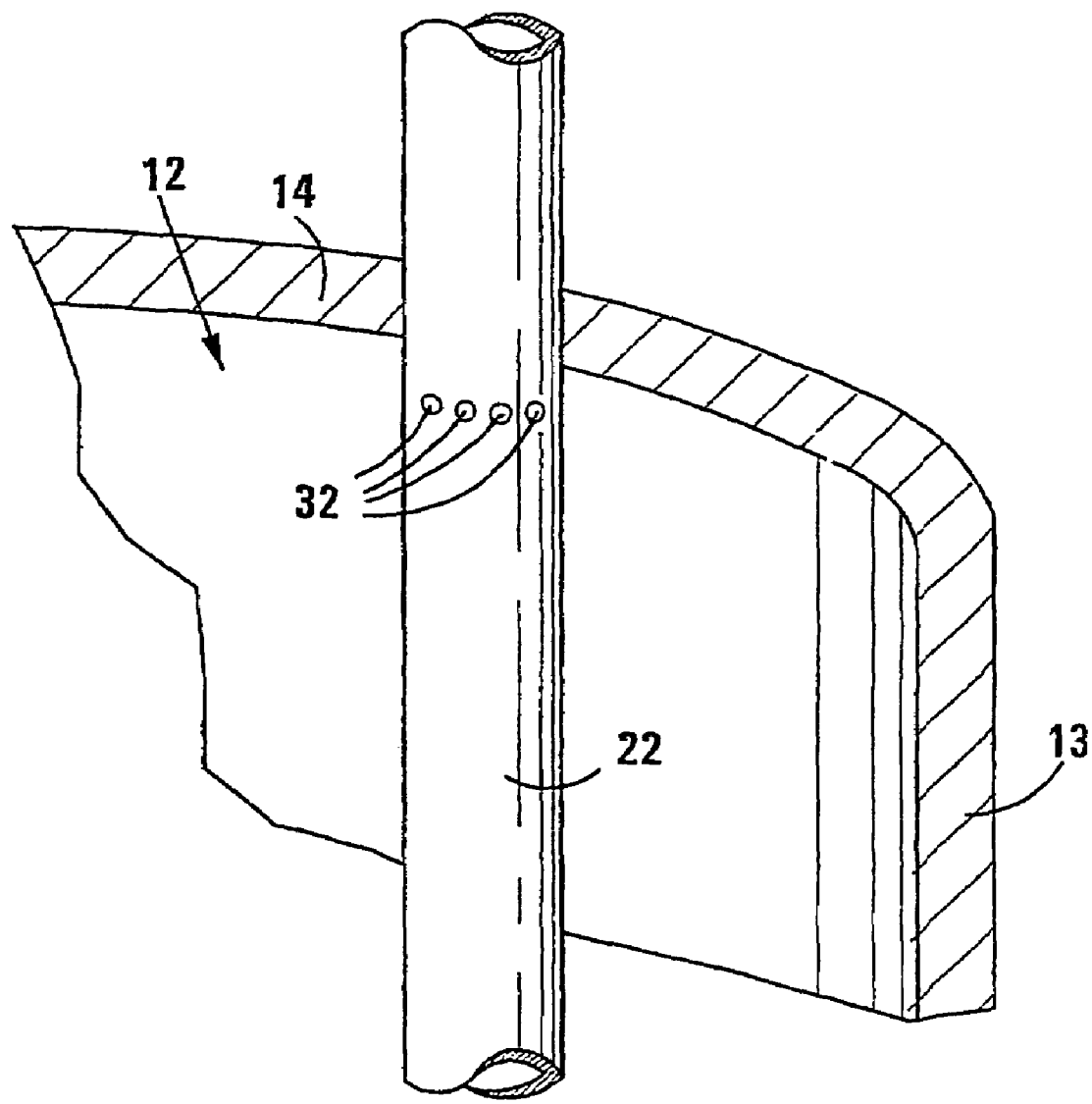

In the drawings,

FIG. 1 shows a schematic layout of part of a cooling system for a nuclear reactor plant; and FIG. 2 shows, on an enlarged scale, part of a coolant inlet pipe of the cooling system.

In the drawings, reference numeral 10 refers generally to part of a cooling system of a nuclear reactor plant in accordance with the invention. In the embodiment shown the cooling system is used to cool the nuclear reactor part of which is generally indicated by reference numeral 11. It may however also be used for cooling a used fuel storage facility.

The nuclear reactor 11 is positioned in a cavity defined within a concrete shell (not shown) and is at least partially surrounded by a plurality of coolant chambers 12, one of which is shown in the drawings. Each chamber 12 is defined by a circular cylindrical wall 13, typically in the form of a length of pipe, a top 14 and a bottom 15 sealing off the ends of the wall 13.

The cooling system 10 includes a pump 16 having a suction or inlet side 18 and a discharge or outlet side 20.

A coolant inlet pipe 22 is connected to the outlet 20 of the pump 16 and extends downwardly through the top 14 of the vessel to the bottom of the coolant chamber 12 at which it terminates in a upwardly directed discharge end 24. An outlet 26 leads from the vessel at a high level and is connected via piping 28 and other cooling circuit elements, generally indicated by reference numeral 30 to the inlet 18 of the pump 16.

Hence, the cooling system is a closed loop cooling system.

As can best be seen in FIG. 2 of the drawings, a plurality of anti-siphon bleed openings in the form of holes 32 provided in the highest portion of the coolant inlet pipe 22 positioned within the coolant chamber 12.

In use, the pump 16 pumps coolant, typically in the form of inhibited demineralised water through the coolant inlet pipe 22 where it is discharged into each of the coolant chambers 12 at a low level through the discharge end 24 of the associated coolant inlet pipe 22.

The coolant flows upwardly through the coolant chamber 12 extracting heat from the reactor and the reactor cavity and the heated coolant flows from the coolant chamber 12 through the pipe 28 where it is cooled and recycled.

In the event of a breach or rupture in the coolant inlet pipe 22 the possibility exists that, depending upon the position of the breach, coolant will be siphoned from the coolant chamber 12 through the coolant inlet pipe 22. However, as the level of coolant in the coolant chamber 12 falls below the level of the holes 32, air from the coolant chamber 12 will flow into the coolant inlet pipe 22 thereby breaking the vacuum and stopping the siphoning to ensure that a relatively high level of coolant remains within the coolant chamber 12.

The reactor can then be shut down, if necessary, and remedial action taken e.g. by repairing the breach.

The holes 32 are typically dimensioned so that in normal use, coolant being pumped by the pump 16 which leaks through the holes 32 into the coolant chamber 12 will have no or little detrimental effect on the cooling system. However, the holes are sufficiently large to bleed enough air into the coolant inlet pipe 22 to break the vacuum and stop the siphoning process. Naturally, the dimensions may vary depending upon the intended application. However, the Inventors believe that in an inlet pipe 22 having a nominal diameter of 100 mm, typically between 4 and 8 holes of between 5 and 10 mm diameter will be provided.

If desired, an anti-siphon valve 34 can be mounted in the inlet pipe 22. The anti-siphon valve 34 is typically positioned in the piping network at the highest point. The anti-siphon valve is configured to open when the pressure in the affected pipe drops below atmospheric pressure thereby permitting air to enter the affected pipe, equalising the pressure and stopping the siphoning action.

The Inventors believe that by leading the inlet pipe into the coolant chamber from a high level, the risk that the coolant chamber will be drained as a result of a breach in the inlet pipe is reduced thereby substantially enhancing the safety of a nuclear reactor plant of which the cooling system forms part. Further, the provision of the anti-siphon means in the form of the bleed openings 32 and valve 34 serves to reduce the risk that coolant will be lost from the coolant chamber as a result of siphoning. The Inventors believe that, in particular, the provision of the anti-siphon bleed openings will provide a simple, reliable and cost effective method of reducing the risk of coolant being lost from the coolant chamber as a result of siphoning.

What is claimed is:

1. A nuclear reactor plant which includes
   a helium cooled nuclear reactor positioned in a cavity defined by a shell; and
   a closed loop liquid cooling system which includes
   at least one coolant chamber defined by a wall having ends which are sealed off respectively by a top and a bottom and positioned in the cavity adjacent to the nuclear reactor;
   a pump having an inlet side and an outlet side;
   a coolant inlet pipe which is connected in flow communication with the outlet side of the pump and which enters the coolant chamber through the top and extends downwardly through the coolant chamber to a discharge end positioned within the coolant chamber; an outlet leading from the coolant chamber which is connected in flow communication with the inlet side of the pump; and
   at least one anti-siphon bleed opening provided in that portion of the coolant inlet pipe positioned in the coolant chamber at a position spaced from the discharge end whereby the coolant inlet pipe and the coolant chamber are connected or connectable in flow communication.

2. A nuclear reactor plant as claimed in claim 1, which includes an anti-siphon valve mounted in the inlet pipe.

3. A nuclear reactor plant as claimed in claim 1, in which a plurality of anti-siphon bleed openings are provided in that portion of the coolant inlet pipe which is positioned at the highest level within the coolant chamber.

4. A nuclear reactor plant as claimed in claim 3, in which the anti-siphon bleed openings are in the form of holes in the coolant inlet pipe, said holes having a combined area of between 1% and 10% of the cross-sectional area of the coolant inlet pipe.

5. A nuclear reactor plant as claimed in claim 3, in which the inlet pipe has a nominal diameter of 100 mm and between four and eight anti-siphon bleed openings are provided therein.

6. A nuclear reactor plant as claimed in claim 3, in which the bleed openings are circular and have a diameter of between 5 mm and 10 mm.

* * * * *

UNITED STATES PATENT AND TRADEMARK OFFICE
CERTIFICATE OF CORRECTION

PATENT NO. : 7,136,449 B2 Page 1 of 1
APPLICATION NO. : 10/332384
DATED : November 14, 2006
INVENTOR(S) : David Richard Nicholls and Ivan Drodskie It is certified that error appears in the above-identified patent and that said Letters Patent is hereby corrected as shown below:

Title Page
Column One
Item (12): Heading
Please delete "Nicholls" and insert -- Nicholls et al. -- in its place

Title Page
Column One
Item (75): Inventor:
After "David Richard Nicholls, Halfway House (ZA)," please insert -- Ivan Drodskie, Lonehill (ZA) --.

Signed and Sealed this

Tenth Day of April, 2007

JON W. DUDAS
*Director of the United States Patent and Trademark Office*